United States Patent [19]

Short, Sr.

[11] Patent Number: 4,505,095
[45] Date of Patent: Mar. 19, 1985

[54] HOOP ADAPTER ASSEMBLY FOR POWERED LAWN MOWER

[76] Inventor: Henry A. Short, Sr., 556 E. 88th St., Chicago, Ill. 60619

[21] Appl. No.: 474,052

[22] Filed: Mar. 10, 1983

[51] Int. Cl.³ .............................................. A01D 35/22
[52] U.S. Cl. .................................................... 56/202
[58] Field of Search ........................................ 56/202

[56] References Cited

U.S. PATENT DOCUMENTS

| | | | |
|---|---|---|---|
| 2,918,694 | 12/1959 | Tarrant | 56/202 |
| 2,932,146 | 8/1960 | Campbell | 56/202 |
| 3,133,396 | 5/1964 | Leader | 56/202 |
| 3,143,842 | 8/1964 | Mattson | 56/202 |
| 3,230,696 | 1/1966 | Liljenberg | 56/202 |
| 3,494,116 | 2/1970 | Lempke | 56/202 |
| 3,553,947 | 1/1971 | Root | 56/202 |
| 3,890,772 | 6/1975 | Seifert et al. | 56/202 |
| 3,928,956 | 12/1975 | Boyer | 56/202 |
| 3,995,414 | 12/1976 | Kerr et al. | 56/202 |
| 4,043,102 | 8/1977 | Uhlinger | 56/202 |
| 4,251,982 | 2/1981 | Skaja et al. | 56/202 |
| 4,345,418 | 8/1982 | Arizpe | 56/202 |

FOREIGN PATENT DOCUMENTS 546180  9/1957  Canada ................................ 56/202

*Primary Examiner*—Paul J. Hirsch
*Attorney, Agent, or Firm*—Thomas R. Vigil

[57] ABSTRACT

The hoop adapter assembly (8) is adapted to be easily attached to a lawn mower (12) about an exit opening (20) of a discharge duct (18) to enable one easily to fit a disposable trash bag (14) on the hoop adapter (10) of the assembly (8) for picking up leaves. The hoop adapter (10) is oval in shape and is held to the frame or housing portion (44, 47) by wire ties (46) or shock cords (49) and the disposable bag (14) is held to the hoop adapter (10) by pinch clamps (15). The spaces (40, 42) between the discharge duct (18) and the hoop adapter (10) provide exit vents for the air that flows from the undercarriage of the lawn mower (12) carrying leaves and debris into the bag (14).

7 Claims, 6 Drawing Figures

HOOP ADAPTER ASSEMBLY FOR POWERED LAWN MOWER

FIELD OF THE INVENTION

The present invention relates to a hoop adapter assembly for mounting on a rotary power mower and to which a disposable trash bag can be mounted primarily for the collection of leaves.

DESCRIPTION OF THE PRIR ART

Heretofore various devices and assemblies have been proposed for attachment to a rotary power lawn mower to catch grass clippings and leaves in order to eliminate raking. Examples of some of the previously proposed devices and assemblies are disclosed in the following U.S. Patents:

| U.S. PAT. NO. | PATENTEE |
|---|---|
| 3,133,396 | Leader |
| 3,916,608 | Garrison |
| 3,995,414 | Kerr et al. |
| 4,186,546 | Machado et al. |
| 4,345,418 | Arizpe |

The Leader U.S. Pat. No. 3,133,396 discloses a receptable and support for attachment to a moving rotary power mower to support a bag made of a cloth-like material for use in collecting grass clippings and leaves.

The Garrison U.S. Pat. No. 3,916,608 discloses a method of and apparatus for collecting grass cuttings comprising a carriage which supports a disposable bag. The bag is positioned with the mouth of the bag held open to intercept a lawn mower discharge stream.

The Kerr et al. U.S. Pat. No. 3,995,414 discloses a removable trash bag assembly for lawn mowers wherein the bag is made of plastic and is hung from a frame attached to the mower. The bag is provided with slits at its mouth which are initially closed but which open as the bag fills to vent air.

The Machado et al. U.S. Pat. No. 4,186,546 discloses a duct leading from the grass blade cutting area in a lawn mower to a disposable bag made of polyethylene plastic, the bag being perforated with air vent holes to allow escape of the forced air that carries cut grass clippings.

The Arizpe U.S. Pat. No. 4,345,418 discloses a disposable bag mounting and shut-down mechanism for a rotary lawn mower in which a disposable collection bag is mounted on a mounting plate. The mounting plate has an air outlet duct to vent air from the collection bag. When the bag is released from the mower, a shut-down mechanism automatically interrupts the engine ignition and brakes the mower blade.

As will be described in greater detail hereinafter, the hoop adapter assembly for a powered lawn mower of the present invention differs from the various devices and apparatus disclosed in the patents identified above by providing an efficient, inexpensive and simple means for mounting a commercially available disposable trash bag on a rotary power mower for the collection of leaves. The hoop adapter assembly and a conventional disposable trash bag mounted thereon are arranged so that it is not necessary to use an air pervious bag. Additionally, the hoop adapter of the present invention requires no special support for the bag.

SUMMARY OF THE INVENTION

The hoop adapter for a powered lawn mower of the present invention provides a simple and efficient structure for collecting leaves from the discharge stream of a rotary power mower into a conventional disposable trash bag mounted on the hoop adapter. The hoop adapter of the assembly is easily attached to a rotary power mower around the discharge airstream outlet by short wires or other means. A mouth of a disposable bag is folded over the hoop adapter and held in place by pinch clamps. When attached to a mower, the hoop adapter defines the shape of an oval and has top, bottom and side edges located outwardly of the discharge opening of the mower so as to define openings into the bag about the mower discharge opening thereby allowing air from the discharge stream entering the bag to vent or exit out of these openings from the disposable bag. In addition, the bottom portion of the hoop adapter assembly with bag attached acts as a scoop for scooping up leaves.

DESCRIPTION OF THE PREFERRED EMBODIMENT

Figure 1:
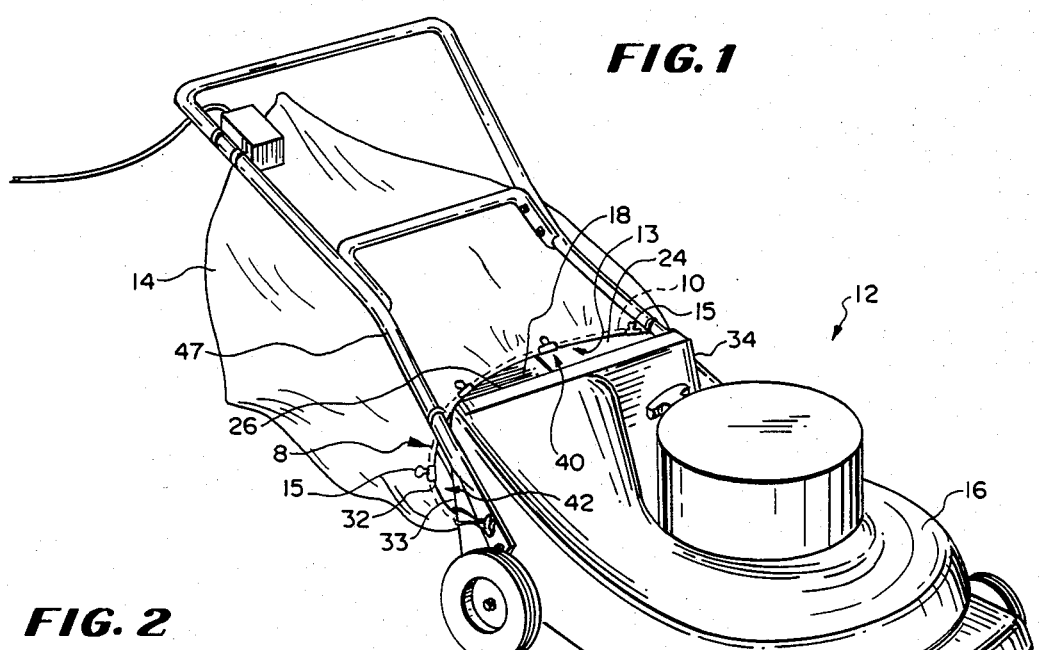
FIG. 1 is a perspective view of a rotary power mower with a hoop adapter assembly constructed according to the teachings of the present invention attached to the mower and shows a disposable bag mounted on a hoop adapter of the assembly.
Figure 2:
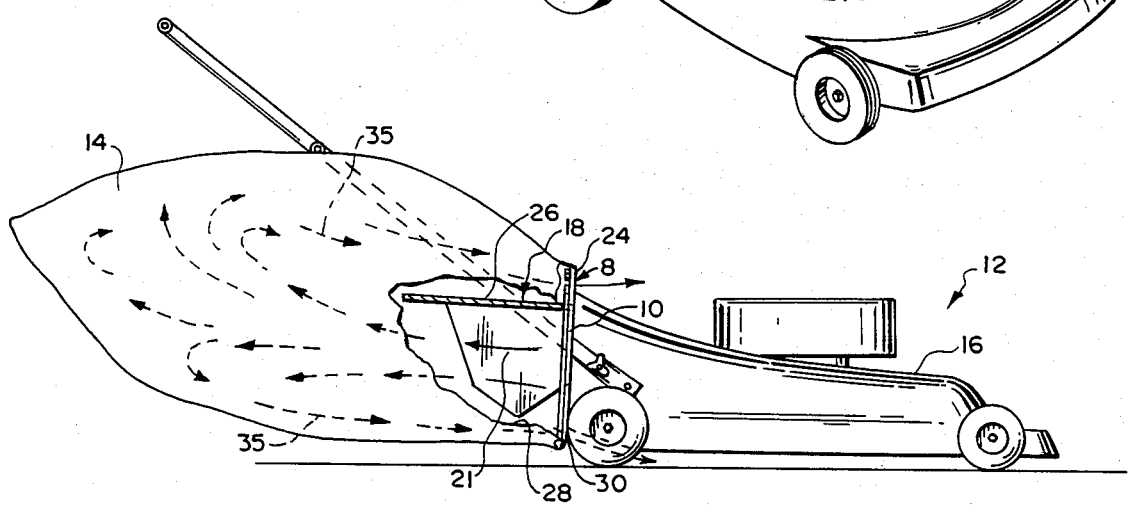
FIG. 2 is a side elevational view with portions broken away of the disposable bag mounted on the hoop adapter and shows the path of the discharge air stream from the mower.

Referring now to the drawings in greater detail and more particularly to FIGS. 1 and 2, there is illustrated therein a loop adapter assembly 8 comprising a hoop adapter 10 attached to a rotary power mower 12, electric or gas driven, with material at a mouth 13 of a disposable trash bag 14 folded over the hoop adapter 10 and held in place by pinch clamps 15 in accordance with the teachings of the present invention.

In operation, the rotating blades (not shown) of the mower 12 generate a stream of air in a housing 16 of the mower 12 and such airstream is directed rearwardly of the housing 16 through a discharge duct 18 and out an outlet opening 20. The airstream is represented by arrows 21 in FIG. 2. Leaves and debris entrained in the airstream 21 and conveyed into the disposable trash bag 14 mounted on the hoop adapter 10 which is attached to the mower 12 around the outlet 20. The hoop adapter 10 has a generally oval shape and can be made of electrician's "fishtape" wire which is made of a spring metal and which has a generally rectangular cross section.

The mouth 13 (FIG. 3) of the bag 14 assumes a generally oval shape when attached to the hoop adapter 12. The bag 14 then has a top portion 24 (FIGS. 1, 2 and 4) extending above a top 26 side of the discharge duct 18, a bottom portion 28 (FIGS. 3 and 4) extending below a bottom edge 30 of the discharge duct 18, and side portions 32 (FIGS. 1 and 2) spaced horizontally outwardly from side 33 and a side edge 34 of the discharge duct 18.

As the moving air stream 21 enters the disposable trash bag 14 it impinges on the wall of the bag and on any leaves or debris collected therein. The air stream 21 reverses directed as indicated by arrows 35, depositing entrained leaves and debris within the bag 14 and vents or exits from the bag 14 through opening portions of the mouth 13 of the bag 14 around the discharge duct 18, such as from opening 40 above duct 18 and opening 42 to the side of duct 18 shown in FIG. 1.

Figure 3:
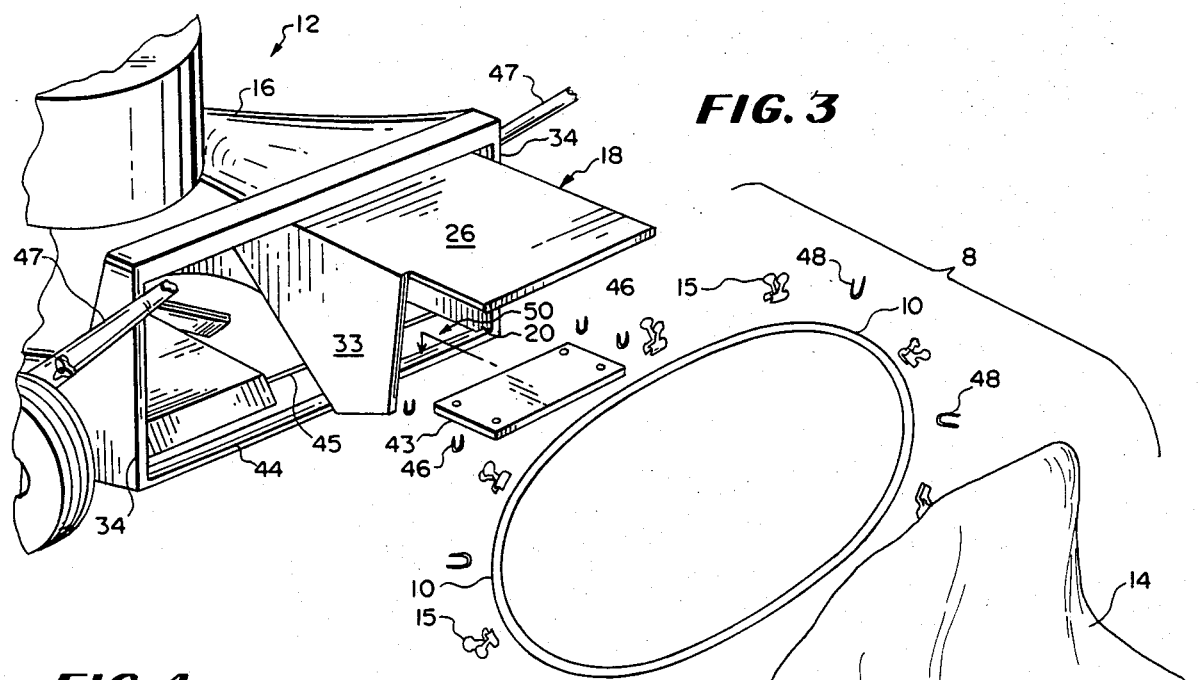
FIG. 3 is an exploded perspective view of the rear mower and shows the mower discharge duct and the hoop adapter assembly comprising a baffle, the hoop adapter, pinch clamps and the disposable bag.

Referring now to FIG. 3, there is illustrated therein an exploded perspective view of the hoop adapter assembly 8 positioned to be attached to the rotary power mower 12 about discharge duct 18. The assembly 8 includes a plate or baffle 43, hoop adapter 10, pinch type clamps 15, and one disposable trash bag 14. The assembly 8 illustrated in FIG. 3 includes the plate or baffle 43 to facilitate collection of leaves with the type of lawn mower 12 shown in FIGS. 1 and 2. The plate or baffle 43 is positioned on and fixed to an undercarriage frame member 44 of the mower 12 and to a rod 45 as shown in FIG. 3 and held in place in any convenient manner such as by wire ties or twist ties 46.

Figure 4:
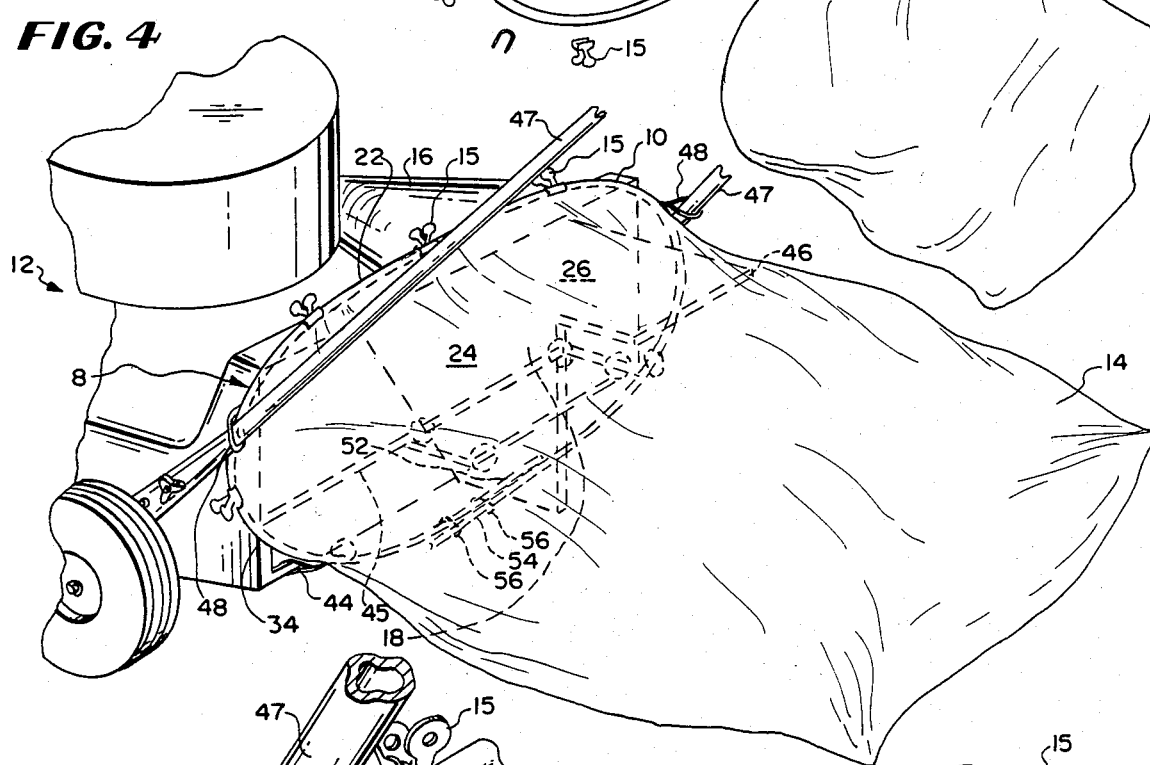
FIG. 4 is a fragmentary perspective view of the assembly shown in FIG. 3 but with the elements of the hoop adapter assembly assembled on the discharge duct ready for operation of the mower to pick up leaves.

In FIG. 4 there is illustrated in greater detail a partial view of the mower 12 with the hoop adapter assembly 8 attached thereto and with the mouth 13 of a disposable trash bag 14 folded over the hoop adapter 10 and held in place by pinch type clamps 15. The disposable trash bag 14 may be held in place on the hoop adapter 10 by any convenient means such as combined magnet/pinch type clamps used for attaching notes to appliances, eg., refrigerators, doors, etc., whereby material at the mouth 13 of the bag 14 is placed over the hoop adapter 10 and held thereby by the clamps with the magnets of the clamps attached to metal portions of the lawn mower housing or frame 47.

Figure 5:
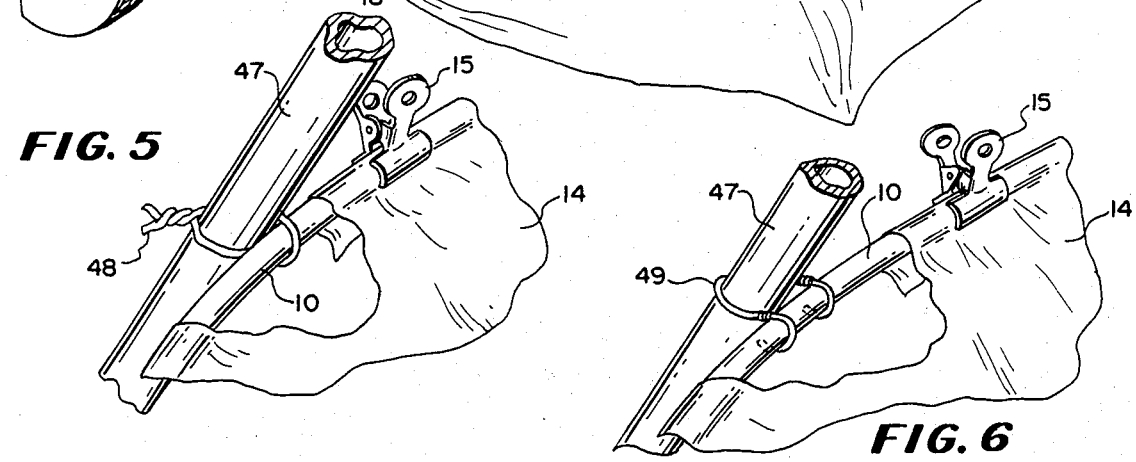
FIG. 5 is an enlarged fragmentary perspective view of a portion of the hoop adapter secured to a portion of a frame of the mower by a "twist tie" piece of wire.

The hoop adapter 10 may be attached to the mower 12 by any convenient means. FIG. 5 illustrates one manner of attaching hoop adapter 10 to the mower 12 by tying the hoop adapter 10 to the frame 47 of the mower 12 with wire ties or twist ties 46.

Figure 6:
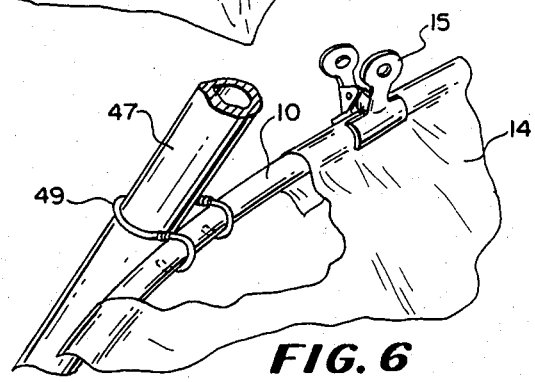
FIG. 6 is an enlarged fragmentary perspective view of a portion of the hoop adapter secured to a portion of a frame of the mower by a "shock cord".

FIG. 6 illustrates another means for attaching the hoop adapter 10 to the frame 47. Here the hoop adapter 10 is attached to the frame 47 by shock cords 49.

It will be understood that the lawn mower 12 is of the type which has a box shaped collection receptacle (not shown) with a lip (not shown) which is adapted to be received in the space indicated by arrow 50 in FIG. 3. In FIG. 3, the arrow 50 indicates where baffle plate 43 is positioned and such baffle plate 43 takes the place of the lip of the collection receptacle. In other lawn mower constructions such a baffle plate 43 may be unnecessary.

Also the hoop adapter 10 has overlapping ends 52 and 54 (FIG. 4) which are frictionally received in spaced apart retaining rings 56 whereby the size of the hoop shape can be adjusted for different exhaust ducts of different lawn mower.

In use when it is desired to pick up leaves, the hoop adapter 10 is secured to the frame portions 44 and 47 of the lawn mower 12. Incidentally, since the hoop adapter 10 does not obstruct discharge duct 18 it can be left attached to the lawn mower 12 when the collection receptacle is attached to the lawn mower 12 although plate 43 would have to be removed for this purpose.

With hoop adapter 10 fixed in place, the material at the mouth 13 of a bag 14 is then folded over the hoop adapter 10 and pinch clamps 15, plain or with magnets, are clamped about the folded material and the hoop adapter 10 as shown. Now with the assembly 8 and bag 14 secured in place, the lawn mower 12 is ready for picking up leaves.

In operation, the air stream 21 causes the bag 14 to "balloon" rearwardly and upwardly such that no extra support is needed for the bag 14 when picking up leaves. However, when picking up grass clippings, it may be necessary or desirable to suspend a strap or belt from frame portion 47 and around the bag 14 to better support the heavier clippings in the bag.

With the simple hoop adapter assembly 8 of the present invention one can easily collect leaves directly into a disposable trash bag 14 with a power lawn mower 12 thereby to eliminate the tedious raking of leaves and stuffing of the leaves into trash bags 14. With the assembly 8 of the present invention, once the bag 14 is full, you merely unclamp pinch clamps 15 and put a "twist tie" around the mouth of the filled bag 14 and your leaf collection is finished.

It will be apparent from the foregoing description that the hoop adapter assembly 8 of the present invention has many advantages, some of which have been described above and others of which are inherent in the invention. Also it will be apparent that modifications can be made to the hoop adapter assembly 8 without departing from the teachings of the present invention. Accordingly, the scope of the invention is only to be limited as necessitated by the accompanying claims.

I claim:

1. In a rotary power lawn mower of the type having a discharge duct with an outlet opening for discharge of an air stream carrying leaves, the improvement comprising a hoop adapted assembly for mounting a disposable, commercially available, plastic trash bag about the outlet opening, said hoop adapter assembly including a metal wire hoop adapter in the shape of an oval which is attached to the lawnmower around the outlet opening thereof with portions extending beyond the edges of the outlet opening, means including twist tie wires, for detachably attaching said metal wire hoop adapter to the lawnmower, and clamping means comprising a plurality of pinch clamps for detachably clamping the mouth of the bag to said hoop adapter whereby air can be vented from the disposable trash bag secured on said hoop adapter and whereby the bottom portion of said hoop adapter and the commercially available, disposable, plastic trash bag secured thereto can act as a scoop for scooping up leaves.

2. The hoop adapter assembly of claim 1 wherein said metal wire hoop adapter is made from a piece of metal wire which is formed into a hoop with overlapping end portions and means are provided for holding said end portions together.

3. The hoop adapter assembly of claim 1 including a baffle mounted to the lawn mower adjacent and forward of said bottom portion of said hoop adapter for deflecting materials toward and into said hoop adapter assembly from an opening which normally receives a lip of a lwan mower collection receptacle.

4. The hoop adapter assembly of claim 1 wherein said means for attaching said hoop adapter to a frame member of the lawn mower can also include shock cords.

5. The hoop adapter assembly of claim 1 wherein said pinch clamps are clamped over a fold of material of the bag folded about said metal wire hoop adapter.

6. The hoop adapter assembly of claim 5 wherein at least one of said pinch clamps includes a magnet which can function to hold the pinch clamp to a metal frame or housing of the power lawn mower.

7. The hoop adapter assembly of claim 2 wherein said holding means comprise one or more rings.

* * * * *